(12) United States Patent
Okuyama et al.

(10) Patent No.: US 7,398,290 B2
(45) Date of Patent: Jul. 8, 2008

(54) DEVICE RETRIEVAL SYSTEM ON THE BASIS OF DEVICE ATTRIBUTES AND METHOD THEREOF

(75) Inventors: Junichi Okuyama, Kanagawa (JP); Katsuya Mitsutake, Kanagawa (JP); Koichi Yoshimura, Kanagawa (JP); Yasutoshi Maeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 701 days.

(21) Appl. No.: 10/400,527

(22) Filed: Mar. 28, 2003

(65) Prior Publication Data
US 2003/0236915 A1    Dec. 25, 2003

(30) Foreign Application Priority Data
Jun. 20, 2002    (JP)    ............ P. 2002-179337

(51) Int. Cl.
*G06F 15/16*    (2006.01)
(52) U.S. Cl. ............... 709/203; 707/3; 707/5; 707/12
(58) Field of Classification Search ............ 705/28, 705/22, 31; 707/103, 3, 5, 102, 12; 709/201, 709/245, 203
See application file for complete search history.

(56) References Cited

U.S. PATENT DOCUMENTS

| | | | | |
|---|---|---|---|---|
| 4,949,303 | A * | 8/1990 | Hoshino et al. ............. | 711/111 |
| 6,523,044 | B1 * | 2/2003 | Muramoto et al. ....... | 707/103 Y |
| 6,539,388 | B1 * | 3/2003 | Hattori et al. ............... | 707/101 |
| 6,850,902 | B1 * | 2/2005 | Finch ........................ | 705/28 |
| 6,965,958 | B1 | 11/2005 | Sugiyama | |
| 2001/0004739 | A1 * | 6/2001 | Sekiguchi et al. .......... | 707/100 |
| 2003/0115199 | A1 * | 6/2003 | Ochiai et al. ................. | 707/10 |
| 2003/0120754 | A1 * | 6/2003 | Muto et al. ................. | 709/220 |
| 2006/0170967 | A1 * | 8/2006 | Maki et al. ................. | 358/1.15 |

FOREIGN PATENT DOCUMENTS

| JP | 10-187742 | 7/1998 |
|---|---|---|
| JP | A 11-232154 | 8/1999 |

(Continued)

OTHER PUBLICATIONS

Microsoft Interactive Developer, Japan, ASCII Corporation, Nov. 18, 1998, No. 10, pp. 9-21.

(Continued)

*Primary Examiner*—Philip Tran
*Assistant Examiner*—Thuong (Tina) T Nguyen
(74) *Attorney, Agent, or Firm*—Oliff & Berridge, PLC

(57) ABSTRACT

A device retrieval system in a network system including a plurality of devices each having at least one attribute. The retrieval system includes: a plurality of device registration units, a device retrieval unit and an identity judgment unit. The device registration unit registers at least a part of the devices and attributes thereof while associating the devices with the attributes respectively. The device retrieval unit retrieves devices and attributes thereof from the devices and the attributes registered in the device registration units. The identity judgment unit judges identity as to whether a device retrieved from one of the device registration units is identical to a device retrieved from one of the others of the device registration units, based on common points of attributes of the retrieved devices.

14 Claims, 11 Drawing Sheets

FOREIGN PATENT DOCUMENTS

JP     A-2001-125761     5/2001

OTHER PUBLICATIONS

Internetworking, Japan, ASCII Corporation, Aug. 1, 1997. vol. 3, No. 8. pp. 31-36.

Sasaki, et al. A construction method of Directory Service using Relational Database. Corrected papers vol. 1 of the 42$^{nd}$ national convention of Information Processing Society of Japan, Shuji Sasaki; Makato Murata; Yasuhisa Tokiniwa; and Kenichi Higuchi, Japan, Information Processing Society of Japan. Mar. 14, 1991, pp. 195-196.

Appendix, Jan. 1, 2008 Japanese Office Action.

Database, Japan, JUSE Press, Ltd., Jun. 15, 1993, Version 1, pp. 177-190.

Feb. 21, 2008 Japanese Office Action.

\* cited by examiner

FIG. 5

| DATABASE TABLE | TEXT | BOOLEAN | NUMERICAL VALUE | | |
|---|---|---|---|---|---|
| DATABASE SYSTEM A | "NETWORK ADDRESS" "PROTOCOL" "SERIAL" | "PAGE ORDER CHANGE PRINT SUPPORT" "EXISTENCE OF SORTER" "DOUBLE-SIDED PRINT SUPPORT" "NEGATIVE/POSITIVE REVERSAL PRINT SUPPORT" | "PAPER SIZE (e.g. A3, A4, A5, A6, B3, B4, B4, B5, LETTER, CARD)" "PAGE ROTATION PRINT SUPPORT (e.g. VERTICAL REVERSED, HORIZONTAL REVERSED, MIRROR REVERSED)" "N-UP(e.g. OUTPUTTING N PAGES OF DOCUMENT ON ONE SHEET) SUPPORT" "ENLARGED/REDUCED PRINT SUPPORT" "PRINT RESOLUTION (e.g. 200 DPI(DOTS PER INCH), 300 DPI, 400 DPI, 600 DPI)" "PRINT COLOR (e.g. BLACK AND WHITE, COLOR)" "PRINT GRADATION NUMBER (e.g. BLACK AND WHITE 1 BPP (BITS PER PIXEL), BLACK AND WHITE 8 BPP, COLOR 8 BPP, COLOR 16 BPP)" | | |
| DATABASE SYSTEM B | "NETWORK ADDRESS" "MAC-ADDRESS" "PROTOCOL" "SERIAL NUMBER" "LOCATION" | "PAGE ORDER" "SORTER" "DOUBLE-SIDED PRINTING" "NEGA-POSI PRINTING" | "PAPER SIZE" "ROTATION PRINTING" "ALLOTMENT PRINTING" "MAGNIFICATION PRINTING" "RESOLUTION" "TONE" | | |
| DATABASE SYSTEM C | "SERIAL NUMBER" "PHYSICAL ADDRESS" "MAKER" "MODEL" ... | "..." | "..." | | |
| ... | | | | | |

FIG. 6

| UNIVERSAL DEVICE ATTRIBUTE | SERIAL NUMBER | MODEL NAME | MANUFACTURER NAME | MAC ADDRESS | IP ADDRESS | ... |
|---|---|---|---|---|---|---|
| DATABASE SYSTEM A | "SERIAL" | | | "NETWORK ADDRESS" | | |
| DATABASE SYSTEM B | "Serial Number" | "MODEL" | "MAKER" | "MAC-Address" | "Network Address" | |
| DATABASE SYSTEM C | "SERIAL NUMBER" | | | "PHYSICAL ADDRESS" | | |
| ... | | | | | | |

DEVICE RETRIEVAL SYSTEM ON THE BASIS OF DEVICE ATTRIBUTES AND METHOD THEREOF

BACKGROUND OF THE INVENTION

1. Field of the Invention

The present invention relates to a device retrieval system and a method thereof for retrieving devices connected to a network and for performing predetermined processings respectively.

2. Background Art

Service for providing devices providing various functions such as scanning and printing (such devices will be hereinafter referred to as devices in a lump) through a network has been put into practical use.

When a wide variety of devices are connected to a network, it is convenient that users can retrieve what device and what processing provides.

To satisfy such a request, there have been hitherto proposed a large number of systems for allowing users' computers to retrieve devices by use of a database.

Here, the number of databases for device retrieval is not limited to one on the network, but a plurality of databases may be provided on the network.

Even if there are a plurality of databases on the network, the range of device choice maybe narrowed when users are allowed to gain access to only one of the databases.

On the other hand, even when users are allowed to gain access to a plurality of databases, it takes much time and effort for users to select devices using the plurality of databases.

To solve such problems, for example, "Japanese Patent Laid-Open No. 232154/1999 (Document 1)" discloses a method for retrieving devices from a plurality of databases in a lump and presenting a result of retrieval to users so as to submit the result for users' device choices.

However, even if retrieval is performed thus on a plurality of databases in a lump, a common device may be registered and administered among a plurality of databases. In such a case, it is not always recognized among the plurality of databases that one device in one database is identical to another in another. In addition, attributes of devices are not always registered and administered in one and the same format among the databases.

In such a case, due to the difference in data format among the databases, there can exist a device which is one device in fact but is presented to users as if it were a plurality of devices. Thus, the users may be confused when making choices of devices.

SUMMARY OF THE INVENTION

The invention was developed in consideration of such problems belonging to the related art. It is an object of the invention to provide a device retrieval system and a method thereof in which, even when a device registered and administered in common to a plurality of databases is retrieved from the plurality of databases, the device can be identified as one and presented to users.

[Device Retrieval System]

In order to achieve the object, the invention provides a device retrieval system in a network system including a plurality of devices each having at least one attribute. The retrieval system includes: a plurality of device registration units for registering at least a part of the devices and attributes thereof while associating the devices with the attributes respectively; a device retrieval unit for retrieving devices and attributes thereof from the devices and the attributes registered in the device registration units; and an identity judgment unit for judging identity as to whether a device retrieved from one of the device registration units is identical to a device retrieved from one of the others of the device registration units, based on common points of attributes of the retrieved devices.

Preferably, the plurality of device registration units register the attributes of the devices in a table format. The device retrieval unit retrieves the devices and attributes thereof registered in the table format. The identity judgment unit judges the identity by checking attributes registered in the table format against one another.

Preferably, the attribute registered by the device registration units includes one or more attributes selected from the group consisting of a serial number, a name, a manufacturer and a network address.

Preferably, the device retrieval system, further includes a plurality of device retrieval devices. The plurality of device retrieval devices includes a first device retrieval device. The first device retrieval device includes the device registration unit and does not include the device retrieval unit and the identity judgment unit.

Preferably, the device retrieval system further includes a plurality of device retrieval devices. The plurality of device retrieval devices includes a second device retrieval device. The second device retrieval device includes the device retrieval unit and the identity judgment unit and does not include the device registration unit.

Preferably, the device retrieval system further includes a plurality of device retrieval devices. The plurality of device retrieval devices includes a third device retrieval device. The third device retrieval device includes the device registration unit, the device retrieval unit and the identity judgment unit.

Preferably, the second device retrieval device includes a judgment result display unit for displaying a judgment result of the identity.

Preferably, the device retrieval system further includes a unit for performing processing for displaying that a plurality of devices judged to be identical are identical, based on a judgment result obtained by the identity judgment unit.

Preferably, the device retrieval system further includes a unit for performing processing for displaying a plurality of devices judged to be identical, as a single device, based on a judgment result obtained by the identity judgment unit.

Preferably, the identity judgment unit stores relationship between an universal device attribute and the attribute registered in the device registration unit; and the identity judgment unit extracts universal device attributes from the attributes of the retrieved devices with reference to the relationship and compares the extracted universal device attributes.

Preferably, the identity judgment unit judges the identity based on degree of coincidence between the extracted universal device attributes.

[Device Retrieval Device]

The invention further provides a device retrieval device in a network system including a plurality of devices each having at least one attribute, the device retrieval device includes one or more units selected from the group consisting of a device registration unit, a device retrieval unit and an identity judgment unit. The device registration unit registers at least a part of the devices and attributes thereof while associating the devices with the attributes respectively. The device retrieval unit retrieves devices and attributes thereof from the devices and the attributes registered in the device registration units.

The identity judgment unit judges identity as to whether a device retrieved from one of the device registration units is identical to a device retrieved from one of the others of the device registration units, based on common points of attributes of the retrieved devices.

[Device Retrieval Method]

The invention further provides device retrieval method in a network system including a plurality of devices each having at least one attribute, the device retrieval method includes: registering at least a part of the devices and attributes thereof while associating the devices with the attributes respectively in a plurality of device registration units; retrieving devices and the attributes thereof from the devices and the attributes registered in the device registration units; and judging identity as to whether a device retrieved from one of the device registration units is identical to a device retrieved from one of the others of the device registration units, based on common points of attributes of the retrieved devices.

[Recording Medium]

The invention further provides a recording medium for storing a program to be executed in a device retrieval system in a network system, the device retrieval system including a plurality of device registration units, the network system including devices each having at least one attribute. The program causes the device retrieval system to execute: registering at least a part of the devices and attributes thereof while associating the devices with the attributes respectively in the plurality of device registration units; retrieving devices and attributes thereof from the devices and attributes registered in the device registration units; and judging identity as to whether a device retrieved from one of the device registration units is identical to a device retrieved from one of the others of the device registration units, based on common points of attributes of the retrieved devices.

BRIEF DESCRIPTION OF THE DRAWINGS

The present invention may be more readily described with reference to the accompanying drawings:

FIG. 5 is a table showing the attributes of devices defined in each database.

FIG. 6 is a table showing universal device attributes defined in the databases.

DETAILED DESCRIPTION OF THE PREFERRED EMBODIMENTS

[Background]

Figure 1:
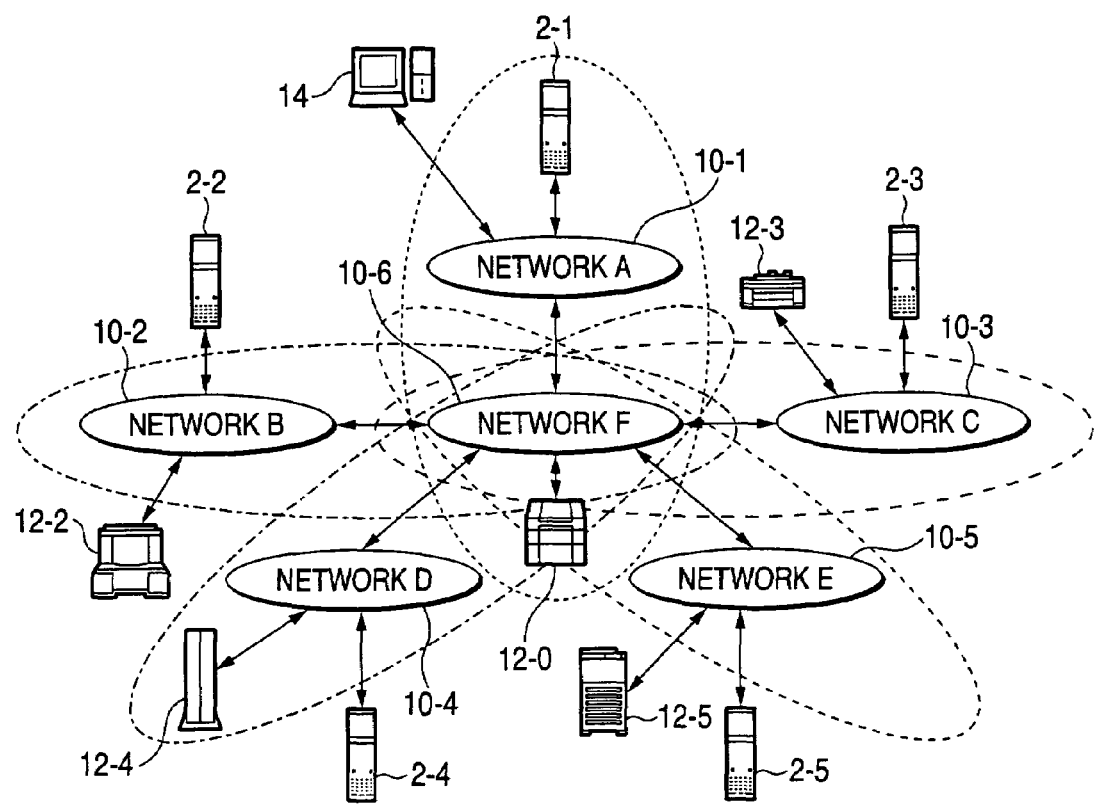
FIG. 1 is a diagram showing the configuration of a network system to which a device retrieval method according to the invention is applied, by way of example.

To make a device retrieval method according to the invention easier to understand, description will be made first on the background to the development of the device retrieval method according to the invention.

A wide variety of information processors (devices) are connected to a computer network. Such devices execute predetermined processings (e.g. printing processing, scanning processing and FAX communication processing) in response to processing requests and input data, and output processing results.

Here, devices for performing one and the same kind of information processing may provide different functions and performances from one another.

For example, when devices are printers, there is a difference in function/performance from one to another. The function/performance includes printing speed, supported colors, supported document/paper size and paper processing functions (double-sided print function, sorting function, etc.).

On the other hand, due to a problem, for example, in the administration cost, a network (WAN; Wide Area Network) is not always administered as a whole in a lump though it is managed by one organization such as one company. It is often that one WAN is a set of small networks (LANs; Local Area Networks) administered by organization units (offices, groups, departments, etc.) of the company.

Further, there is also a worldwide computer network such as the Internet.

In addition, the number of devices belonging to one and the same category and connected to one LAN network is not always one. A plurality of devices which belong to one and the same category but are different in performance/function may be connected to one LAN network.

As described above, a large number of devices are connected to one computer network, and the devices also range over a wide variety of types, functions/performances, and administration forms.

When a user uses a device, a device having device attributes satisfying the user's request has to be chosen based on the device attributes expressing the function/performance of the device (A3 paper support, color print support, print speed (e.g. 60 ppm), physical position information, supported protocol, etc. in the case of a printer).

For such a choice of a device, there is proposed a method in which device attributes are administered by a database, and a user gains access to the database so as to choose a device while referring to the device attributes presented by the database.

In addition, currently, there are a plurality of defacto standards for database systems.

In addition, databases for use in device retrieval are often constructed and managed individually by each organization unit such as a group or a department in the same manner as the LANs.

In such a case, from the point of view of the physical position relationship, the cost, and so on, it is difficult that a database administered by an organization unit is constructed and managed beyond the fence of such a unit. Thus, such databases are often constructed and managed by each organization unit.

Databases among organization units are not always unified in species. Accordingly, different species of databases can be present together in one network.

In addition, databases may be manufactured by different makers, or managed by different operating agents. Thus, device attributes may be defined uniquely by each maker or each operating agent. As a result, the device attributes may be not compatible.

When different kinds of databases are present together, a user may be able to use only one kind of database suitable to the retrieval software of the user's PC in order to make a choice of a device based on its device attributes, even if there are many databases in the network.

In addition, as described above, according to the method disclosed in Document 1, when a device is common to a plurality of databases, the device registered and administered in one of the databases cannot be judged to be identical to the device registered and administered in another. Thus, there is a case that one device having device attributes satisfying the request of a user is presented to the user as if there were a plurality of such devices.

In such a case, the user has to examine whether the user should choose the plurality of devices presented by the databases individually though these devices are identical in fact.

Thus, according to this method, quite useless work that would be not required in fact may be imposed on the user.

In order to solve such problems, in a device retrieval method according to the invention, the number of devices provided in fact in a network is brought in line with the number of devices presented by databases.

That is, the device retrieval method according to the invention is devised so that the identity of devices acquired from different database systems with each other can be judged from their device attributes.

As described above, any device is hardware manufactured to specialize in some information processing.

Hardware has a body, and hence has physical information that will remain the same as long as it exists.

The device retrieval method according to the invention uses such physical information to judge the identity of devices.

The physical information is a universal device attribute that is registered and administered identically among different databases. Examples of such universal device attributes include a serial number, a model name, a manufacturer name, a MAC address, and a uniquely determined IP address.

Specifically, in the device retrieval method according to the invention, such universal device attributes are extracted from device attributes obtained from a plurality of different kinds of databases, and the extracted universal device attributes are checked against one another so that the identity of the devices is judged.

That is, when the universal device attributes of one device administered in one database coincide with those of another device administered in another database, it is concluded that these devices are identical. On the contrary, when the universal device attributes of one device administered in one database do not coincide with those of another device administered in another database, it is concluded that these devices are not identical.

By identifying devices in such a manner, devices identical to each other and managed on different databases can be presented as one device to the user just as it is in fact. Thus, the user can get rid of the useless work and effort.

Embodiment

An embodiment of the invention will be described below.

FIG. 1 is a diagram showing the configuration of a network system 1 to which a device retrieval system according to the invention is applied, by way of example.

Figure 3:
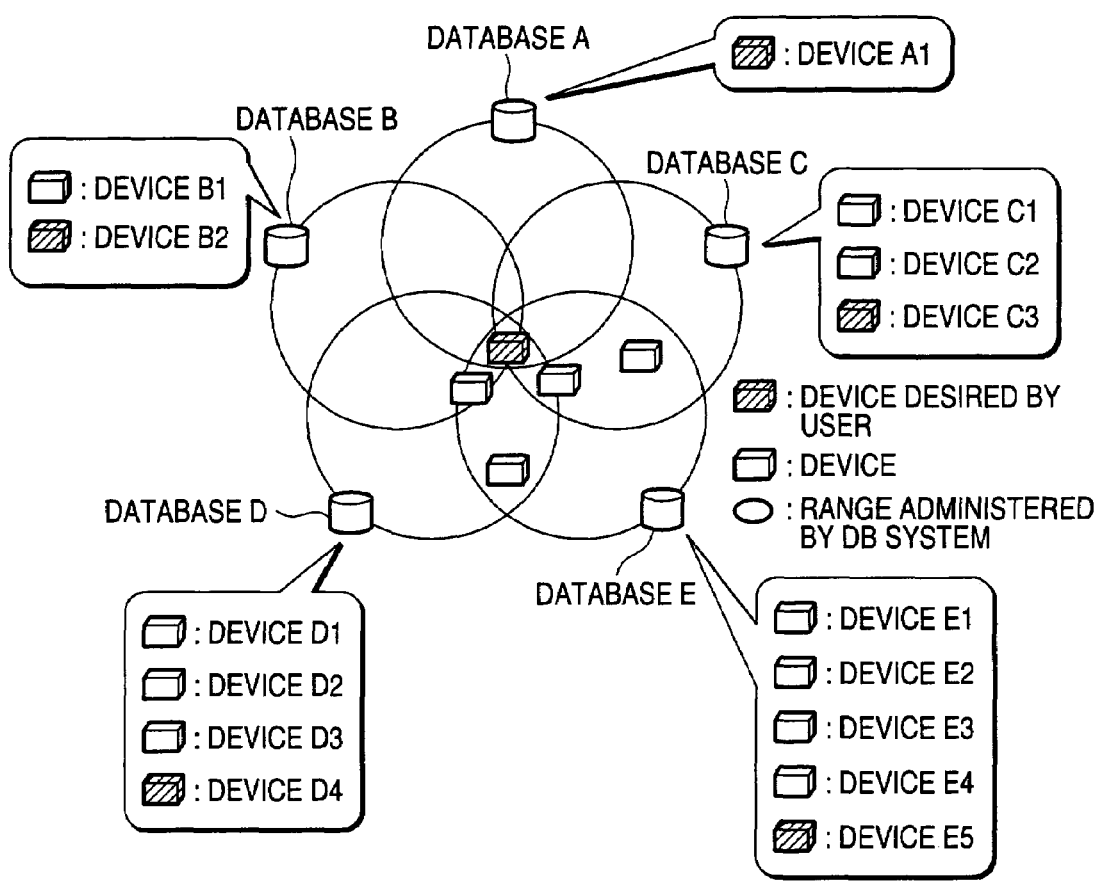
FIG. 3 is a diagram showing devices registered in each database shown in FIG. 1, by way of example.

As shown in FIG. 1, the network system 1 is constituted by six networks 10-1 to 10-6 (Networks A to F) connected to one another, databases 2-1 to 2-5 (Database A to E) connected to the networks 10-1 to 10-5 respectively, devices 12-2 to 12-5 and 12-0 (Devices B to E and A (B1-E5 and A1; FIG. 3)) connected to the networks 10-2 to 10-6 respectively, and a user computer (user PC) 14 connected to the network 10-1.

Figure 2:
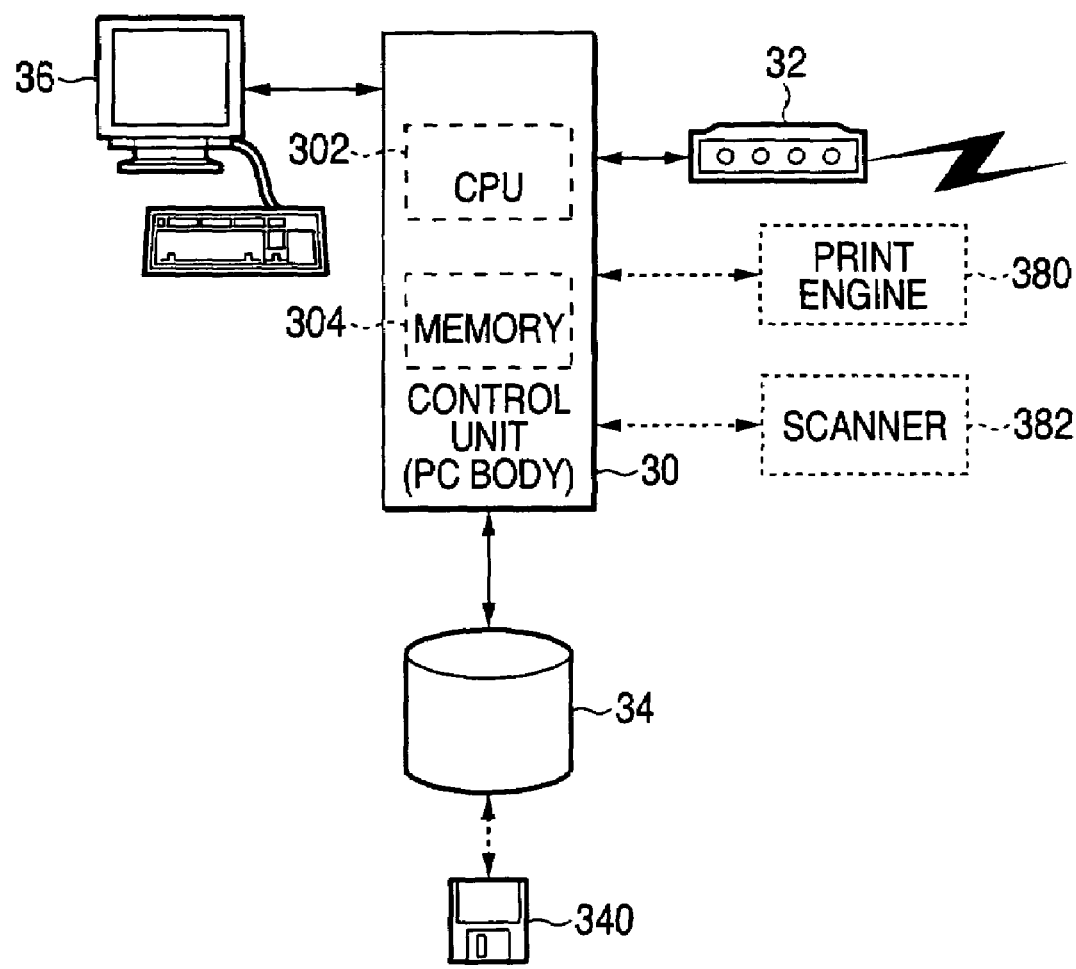
FIG. 2 is a diagram showing the hardware configuration of a database, a device and a user PC shown in FIG. 1, by way of example.

FIG. 2 is a diagram showing the hardware configuration of the database 2, the device 12 and the user PC 14 shown in FIG. 1, by way of example.

Incidentally, hereinafter, a plurality of constituent members such as the databases 2-1 to 2-5 will be abbreviated to the database 2 or the like when they are referred to in a lump.

As shown in FIG. 2, each of the database 2, the device 12 and the user PC 14 is constituted by a control unit (PC body) 30 including a CPU 302, a memory 304 and so on, a communication unit 32, a recording unit 34 such as an HDD unit, a CD unit or an FDD unit, and an input/display unit 36 including an LCD/CRT display unit, a keyboard/mouse, and so on.

As shown by the broken lines in FIG. 2, the device 12 further has a print engine 380, a scanner 382 or the like.

That is, each of the database 2 and the user PC 14 has constituent members as a computer that can make communication through the network 10, and the device 12 further has constituent members for attaining a function that should be provided for the user PC 14.

FIG. 3 is a diagram showing the devices 12 registered and administered in the databases 2 shown in FIG. 1, respectively, by way of example.

As shown respectively with the ellipses of broken lines in FIG. 1, or as shown in FIG. 3, for example, the databases 2-1 to 2-5 register and manage the devices 12 connected to the networks 10-1 to 10-5 and the device 12 connected to the network 10-6, respectively, in the network system 1.

That is, for example, as shown in FIG. 3, the device 12-0 (Device A1) is registered and administered in the database 2-1.

In addition, the devices 12-0 and 12-2 (Devices B1 and B2, providing Device B2 is identical to Device A1 in fact) are registered and administered in the database 2-2.

In addition, the devices 12-0 and 12-3 (Devices C1 to C3, providing Device C3 is identical to Device A1 in fact) are registered and administered in the database 2-3.

In addition, the devices 12-0 and 12-4 (Devices D1 to D4, providing Device D4 is identical to Device A1 in fact) are registered and administered in the database 2-4.

In addition, the devices 12-0 and 12-5 (Devices E1 to E5, providing Device E5 is identical to Device A1 in fact) are registered and administered in the database 2-5.

In the network system 1, the device 12-0 (Device A1) is registered and administered in the databases 2-1 to 2-5 in one and the same data format or in different data formats.

Figure 4:
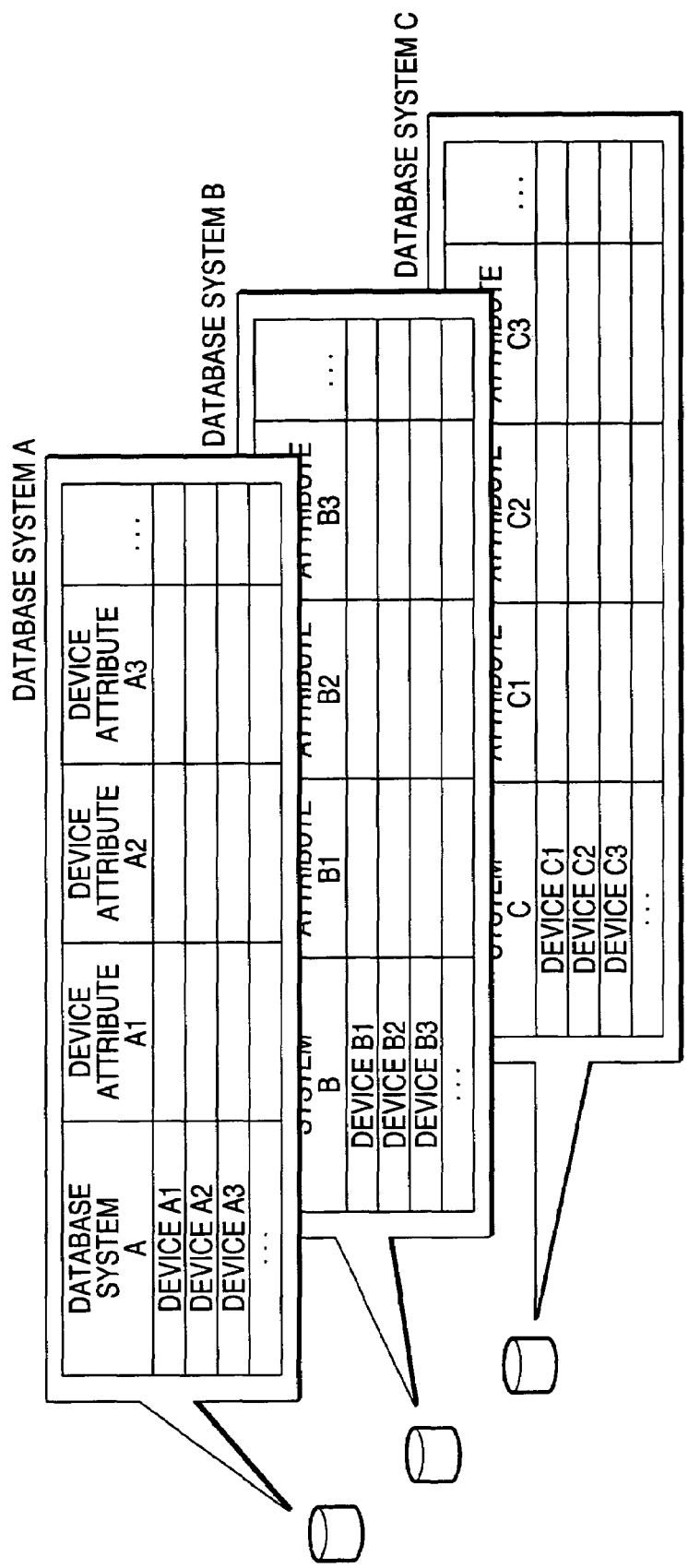
FIG. 4 is a table showing devices and attributes thereof registered and administered in each database.

FIG. 4 is a table showing devices and attributes thereof registered and administered in each database 2.

FIG. 5 is a table showing the attributes of devices defined in each database 2.

FIG. 6 is a table showing the universal device attributes defined in the databases 2.

As shown in FIG. 4, each device 12 registered and administered in each data base 2 is associated with its device attributes and stored/administered in a table format as a database table.

Here, the table format means the state where there are one or more pairs of values corresponding to respective items of device attributes.

However, the device attributes defined in each database 2 are not always unified as shown in the form of a device attribute table in FIG. 5.

On the other hand, the device attributes defined in each database 2 include the universal device attributes. As shown in FIG. 6, a table of the universal device attributes (universal device attribute table) defined in each database 2 can be made up in a table format.

Description will be made in more detail.

As shown in FIG. 5, in the database 2-1 (Database A; FIG. 1), for example, "network address", "protocol", "paper size (e.g. A3, A4, A5, A6, B3, B4, B5, letter, card)", "page rotation print support (e.g. vertical reversed, horizontal reversed, mirror reversed)", "page order change print support", "N-up (e.g. outputting N pages of document on one sheet) support", "existence of sorter", "double-sided print support", "enlarged/reduced print support", "print resolution (e.g. 200 dpi (dots per inch), 300 dpi, 400 dpi, 600 dpi)", "print color (e.g. black and white, color)", "print gradation number (e.g. black and white 1 bpp (bits per pixel), black and white 8 bpp, color 8 bpp, color 16 bpp)", "negative/positive reversal print support" and "serial" are stored and administered as device attributes in the form of a database table.

In addition, as shown in FIG. 5, in the device attribute table stored and administered by each database 2, there are information administered as text data, information stored and administered as binary information indicating presence or absence, and information stored and administered as numerical information, to which labels such as "text", "boolean" and "numerical value" are used respectively.

In addition, in the universal device attribute table shown in FIG. 6, for example, "serial number", "model name", "manufacturer name", "MAC address", "IP address", etc. are stored and administered as universal device attributes.

Consider that universal device attributes, for example, serial numbers are extracted from the device attributes obtained from each database 2 as shown in the database table (FIG. 4). In this case, first, with reference to the device attribute table shown in FIG. 5 and the universal device attribute table shown in FIG. 6, it is judged that "serial number" is administered as "serial", "SerialNumber" and "serial number" in the databases 2-1 to 2-3 (Databases A to C) respectively.

Next, on the basis of this judgment result, information indicating the serial number of each device 12 is extracted from the database table (FIG. 4).

As described above, the universal device attributes (serial numbers, model names, etc.; FIG. 6) extracted from the database table (FIG. 4) are checked against one another so as to identify the devices 12.

More specifically, the value of the universal device attribute "serial" administered in the database 2-1 (Database A) and the value of the universal device attribute "SerialNumber" stored in the database 2-2 (Database B) are uniformed into a character code such as "Shift-JIS", and then compared with each other. When they coincide with each other, it is possible to identify the device administered in the database 2-1 (Database A) with the device administered in the database 2-2.

On the other hand, when one device 12 does not coincide with another device 12 all over the universal device attributes shown in FIG. 6, the devices 12 can be identified with each other, for example, by use of a threshold processing algorithm using coincidence.

Description will be made more specifically. For example, assume that there is used an algorithm "devices are identical when their coincidence is 100%". In this case, when the value of the universal device attribute "serial" in the Database A is "SER1234-5678" and the value of the universal device attribute "SerialNumber" in the Database B is "SER1234-5678", the coincidence is 100%. Thus, it is concluded that the devices 12 stored and administered in these Databases A and B are identical.

In addition, when the value of the universal device attribute "serial" in the Database A is "SER1234-5678" and the value of the universal device attribute "SerialNumber" in the Database B is "SER1234-8765", the coincidence is 66.7%. Thus, it is concluded that the devices 12 are not identical.

Figure 7:
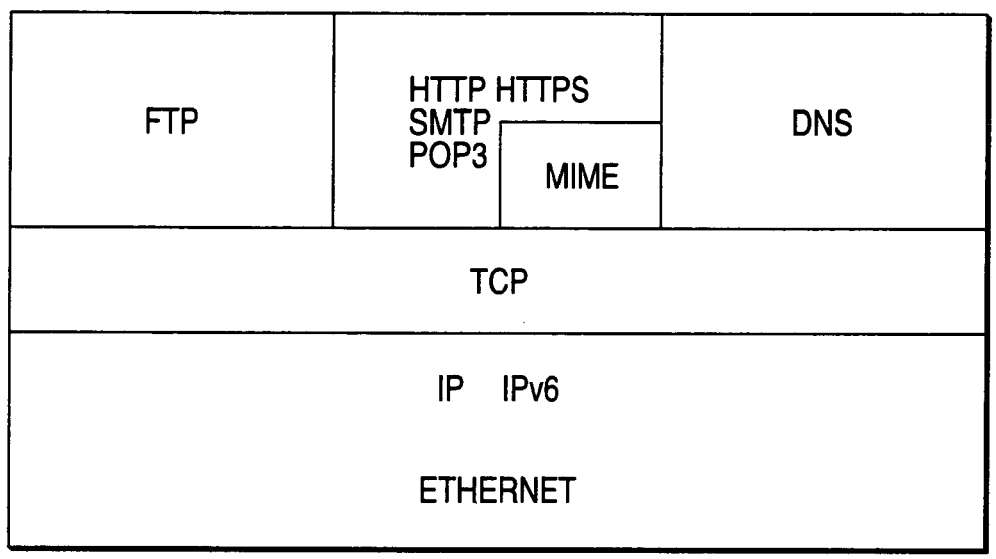
FIG. 7 is a diagram showing an HTTP transfer format.

FIG. 7 is a diagram showing an HTTP transfer format.

A judgment result obtained thus is transmitted from the database 2 to the user PC 14, and presented to the user.

To transmit the judgment result from the database 2 to the user PC 14, for example, there is adopted a method in which the judgment result described in HTML is transmitted by HTTP.

Figure 8:
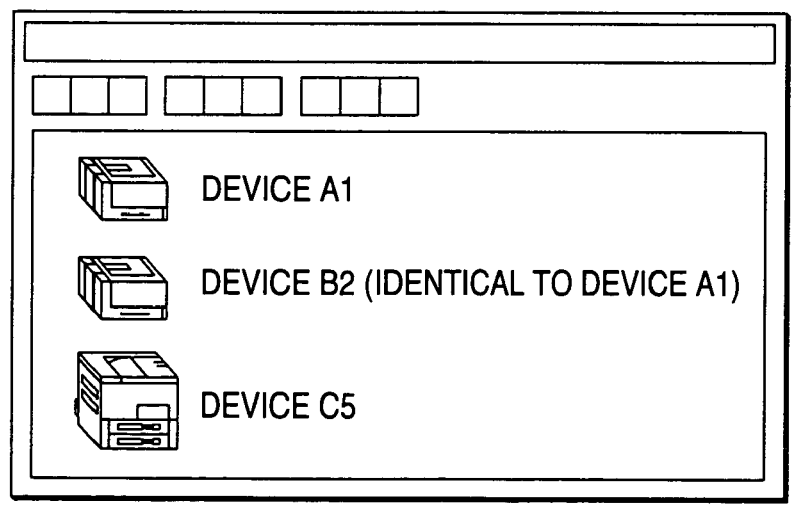
FIG. 8 is a view showing a first user interface (UI) image for presenting identified devices to the user.

FIG. 8 is a view showing a first user interface (UI) image for presenting identified devices 12 to the user.

Figure 9:
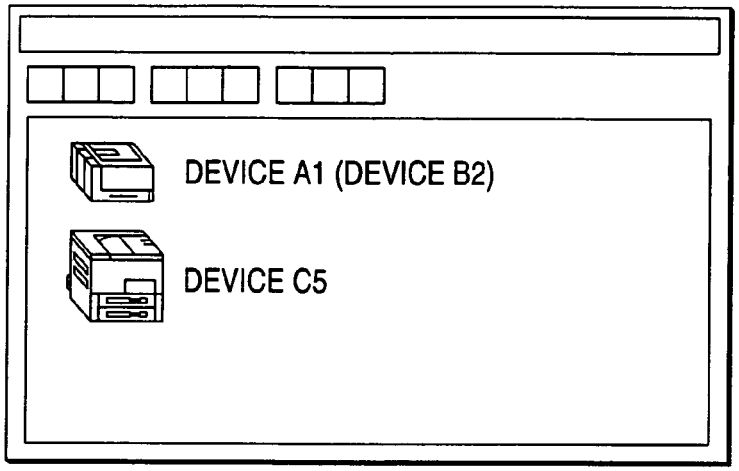
FIG. 9 is a view showing a second UI image for presenting identified devices to the user.

FIG. 9 is a view showing a second UI image for presenting identified devices 12 to the user.

Figure 10:
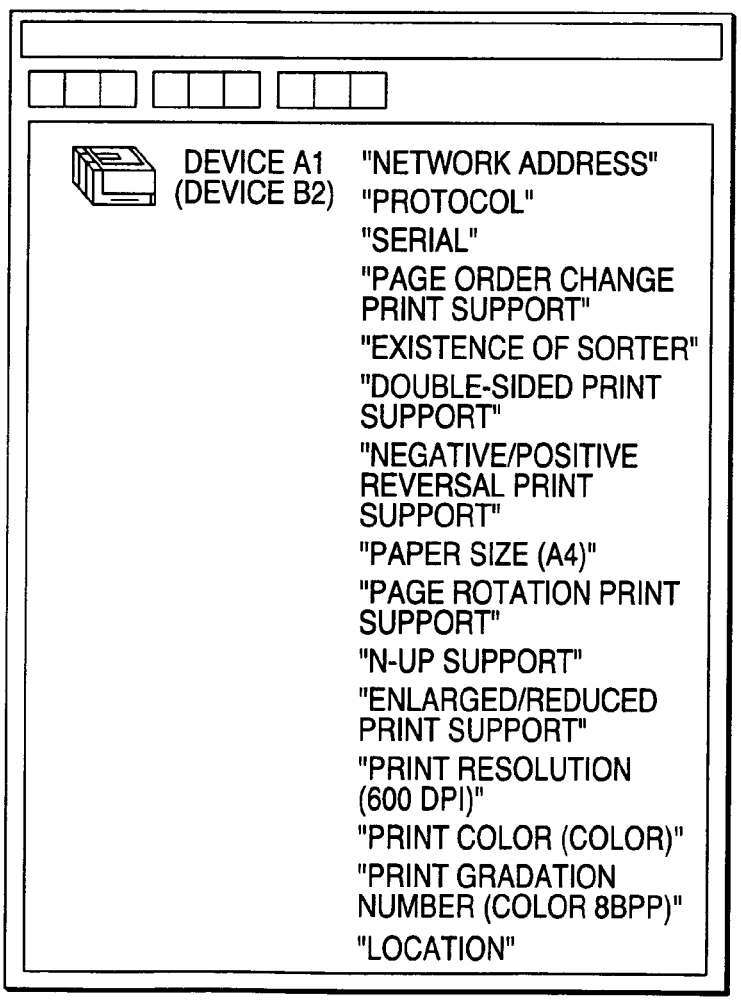
FIG. 10 is a view showing a third UI image for presenting identified devices to the user.

FIG. 10 is a view showing a third UI image for presenting identified devices 12 to the user.

Incidentally, when the devices 12 identified thus are presented to the user, an image showing that a plurality of devices are identical may be used as shown in FIG. 8, or an image showing only one of the devices judged to be identical may be used as shown in FIG. 9.

Further, for presenting identified devices 12 to the user, an image having not only universal device attributes but also device attributes belonging to each device 12 may be used as shown in FIG. 10.

Incidentally, an image in which a device attribute "Location" of the device 12-2 (Device B2) has been added is shown in FIG. 10 by way of example.

Figure 11:
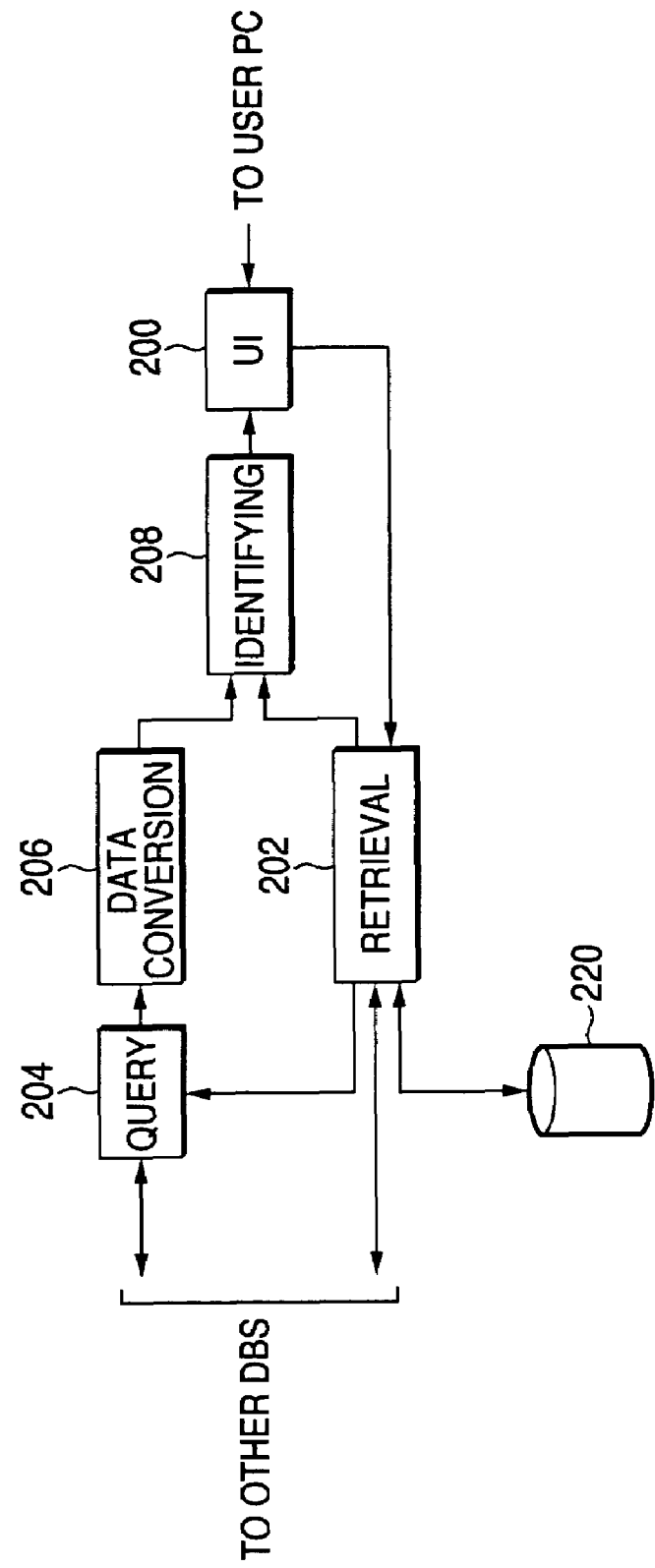
FIG. 11 is a diagram showing the configuration of a database program to be executed in each database shown in FIG. 1 and so on, and for implementing the device retrieval method according to the invention.

FIG. 11 is a diagram showing the configuration of a database program (DB program) 20 to be executed in each database 2 shown in FIG. 1 and so on, and for implementing the device retrieval method according to the invention.

As shown in FIG. 11, the DB program 20 is constituted by a UI portion 200, a retrieval portion 202, a query portion 204, a data conversion portion 206, an identifying portion 208 and a device DB 220.

The DB program 20 is supplied to each database 2 through a recording medium 340 (FIG. 2) or the like, loaded in the memory 304, and executed.

The UI portion 200 provides a UI function for the user PC 14, accepts information (such as device attributes) indicating a subject of retrieval by the user of the user PC 14 through the network 10, and outputs the information to the retrieval portion 202.

In addition, the UI portion 200 produces a UI image (FIGS. 8 to 10) showing a result of identifying processing by the identifying portion 208, and displays the UI image to the user of the user PC 14 through the network 10.

The device DB 220 manages the devices 12 and their device attributes (FIG. 4).

In addition, the device DB 220 manages the device attribute table shown in FIG. 5 and the universal device attribute table shown in FIG. 6, which tables are used for processing by the constituent members of the DB program 20.

The retrieval portion 202 makes retrieval on the device DB 220 in accordance with a request from another database 2 or in accordance with a request from the user PC 14 through the UI portion 200, and retrieves a device 12 and its device attributes corresponding to the information specifying a subject of retrieval.

By the retrieval portion 202, the device 12 and its device attributes found as a result of retrieval on the device DB 220 are outputted to the identifying portion 208 in a format common to all the DB programs 20 operating on the databases 2.

In addition, the retrieval portion 202 outputs the information specifying the subject of retrieval to the query portion 204, and makes a request to the query portion 204 for retrieval of the device 12 requested through the UI portion 200.

The query portion 204 transmits the information specifying the subject of retrieval to the other databases 2 through the network 10 in response to the request from the retrieval portion 202, and makes a request to the other databases 2 for retrieval on their device DBs 220.

The query portion 204 outputs retrieval results replied from the other databases 2 in response to the request, to the data conversion portion 206.

The data conversion portion 206 converts the retrieval results (the devices 12 and their device attributes) supplied from the query portion 204 into data having a format common to all the DB programs 20 operating on the databases 2, and outputs the data to the identifying portion 208.

Figure 12:
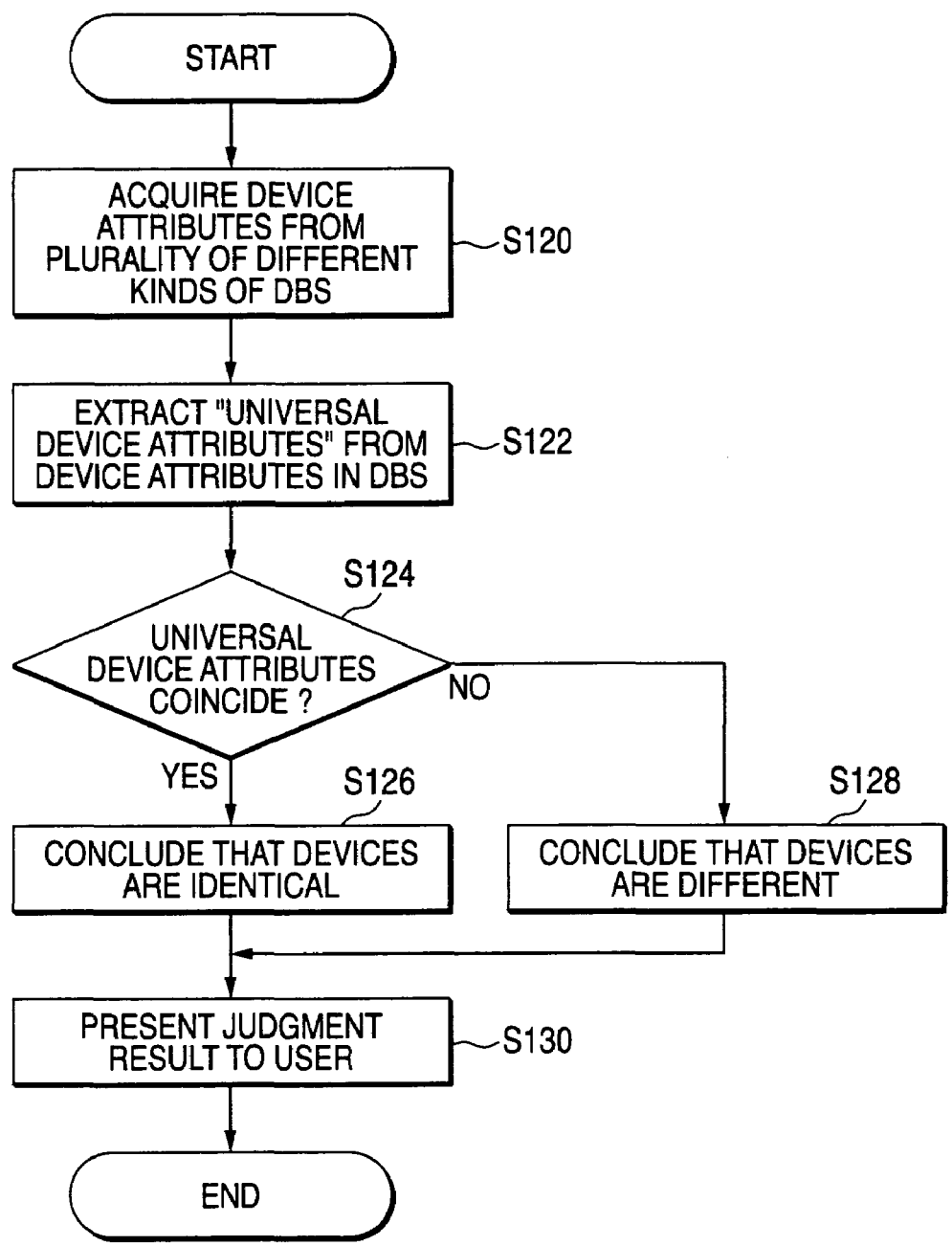
FIG. 12 is a flow chart showing identifying processing by an identifying portion shown in FIG. 11.

FIG. 12 is a flowchart showing the identifying processing by the identifying portion 208 shown in FIG. 11.

The identifying portion 208 arranges the retrieval result obtained from the UI portion 200 and the retrieval results sent from the other databases 2 as shown in FIG. 4, and performs processing for identifying the devices 12 as described with reference to FIGS. 5 and 6.

The processing of the identifying portion 208 will be described further with reference to FIG. 12.

As shown in FIG. 12, in Step 120 (S120), the DB program 20 acquires retrieval results (device attributes) from the device DB 220 of its own and the device DBs 220 in the other databases 2.

Further, the identifying portion 208 makes up a database table (FIG. 4) from these retrieval results.

In Step 122 (S122), the identifying portion 208 refers to the device attribute table and the universal device attribute table shown in FIGS. 5 and 6, and extracts universal device attributes of each device included in the database table (FIG. 4).

In Step 124 (S124), the identifying portion 208 refers to the device attribute table and the universal device attribute table shown in FIGS. 5 and 6, and judges whether the universal device attributes of each device 12 included in the database table (FIG. 4) as a subject of comparison coincide with those of another device 12 included therein, or not.

When the devices 12 coincide with each other in their universal device attributes, the identifying portion 208 advances to the processing of S126. Otherwise, the identifying portion 208 advances to the processing of S128.

In Step 126 (S126), the identifying portion 208 concludes that the devices 12 as a subject of comparison are identical.

In Step 128 (S128), the identifying portion 208 concludes that the devices 12 as a subject of comparison are different devices.

When such judgment made on all the devices is terminated, the identifying portion 208 outputs a judgment result to the UI portion 200. The UI portion 200 presents the judgment result to the user of the user PC 14 as shown in FIGS. 8 to 10.

The overall operation of the network system 1 will be described below.

Figure 13:
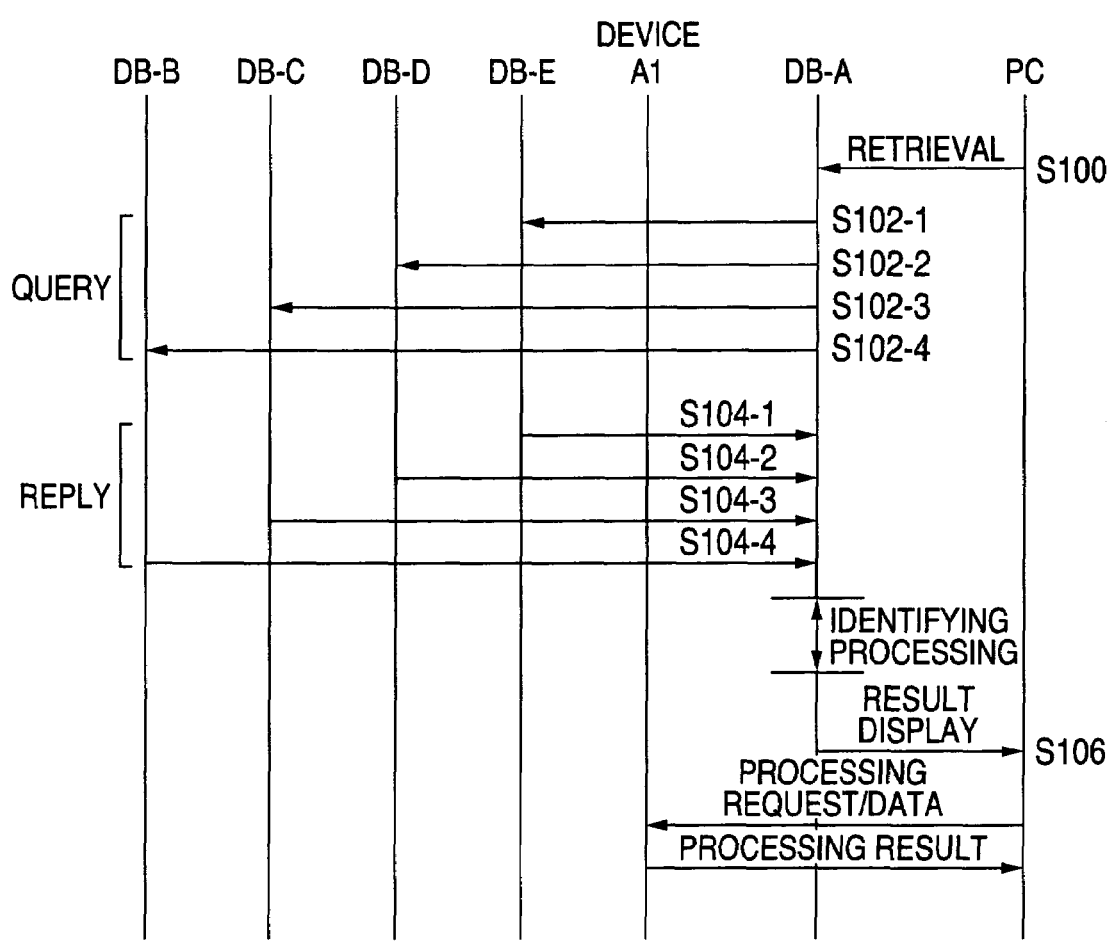
FIG. 13 is a diagram showing a communication sequence in the network system shown in FIG. 1, by way example.

FIG. 13 is a diagram showing a communication sequence in the network system 1 shown in FIG. 1, by way of example.

As shown in FIG. 13, when the user uses the user PC 14 to make a request to the database 2-1 (Database A) for retrieval with a specified subject of retrieval (S100), the DB program 20 operating on the database 2-1 (Database A) performs retrieval on the device DB 220 of its own. In addition, the DB program 20 sends a query to each of the other databases 2-2 to 2-5 (Databases B to E) as to whether there is a device 12 corresponding to the information (device attributes and so on) for specifying the subject of retrieval (S102-1 to S102-4).

In response to the query from the database 2-1 (Database A), each of the other databases 2-2 to 2-5 (Databases B to E) performs retrieval on the device DB 220 of its own, and replies to the database 2-1 (Database A) with a retrieval result (S104-1 to S104-4). Then, the database 2-1 (Database A) performs the identifying processing shown in FIG. 12, and presents a result to the user of the user PC 14.

The user of the user PC 14 gains access to the device 12 obtained as the result of retrieval so as to make a request to the device 12 for processing. The device 12 performs processing in response to the request, and replies to the user PC 14 with a processing result.

[Modification]

Incidentally, all the constituent members of the DB program 20 shown in FIG. 11 are not required in all the databases 2. From the description that has been described above, it will be obvious for those skilled in the art that the device retrieval method according to the invention can be implemented as follows. That is, some of the databases 2 are designed to execute only the device DB 220 in which, of the DB program 20 shown in FIG. 11, only the function as the retrieval portion 202 is provided for performing retrieval in response to a query from another database 2. The other databases 2 are designed to execute only the UI portion 200, the retrieval portion 202, the operation detection portion 204, the data conversion portion 206 and the identifying portion 208.

In addition, the device attributes that have been described above are exemplary. Other device attributes may be registered and administered in the device DB 220 desirably.

As described above, according to a device retrieval system and a method thereof according to the invention, even if device retrieval is performed on a plurality of databases, a device registered and administered in common to the plurality of databases can be identified as one and presented to the user.

What is claimed is:

1. A device retrieval system comprising:
a plurality of databases, each database storing at least one of a part of a device registration and a device attribute;
a device retrieval unit that retrieves the at least one of device registration and device attribute from the plurality of databases;
an identifying unit that identifies whether a first device retrieved from a database is identical to a one or more devices retrieved from another database, based on the attributes of the first retrieved device and the one or more retrieved devices;
a display that displays a result identified by the identifying unit;
wherein the display displays the first retrieved device and the one or more retrieved devices judged to be identical as a single device based on the result identified by the identifying unit;

wherein the single device represents the first retrieved device and the one or more retrieved devices judged to be identical.

2. The device retrieval system according to claim 1, further comprising: a plurality of device registration units, each device registration unit registering at least one of a part of a device and a device attribute in a database.

3. The device retrieval system according to claim 2, wherein the device registration unit registers at least one of a part of a device and a device attribute in a database in a table format, and wherein the identifying unit identifies whether the first device retrieved from the database is identical to the one or more devices retrieved from the other database, based on the attributes of the first and the one or more devices registered in the table format.

4. The device retrieval system according to claim 1, wherein the device attribute includes at least one of a serial number, a name, a manufacturer, and a network address of the devioe-retrieved devices.

5. The device retrieval system according to claim 1, wherein the identifying unit:

stores a relationship between a universal device attribute and the device attribute stored in the database; and extracts universal device attributes from the attributes of the retrieved devices based on the stored relationship, and compares each extracted universal device attribute to other universal device attributes.

6. The device retrieval system according to claim 5, wherein the identifying unit determines that the retrieved devices are identical based on a degree of coincidence between the extracted universal device attributes.

7. A device retrieval device comprising:

a device retrieval unit that retrieves at least one of device registration and device attribute from a plurality of databases, wherein each database stores at least one of a part of the device registration and the device attribute;

a device retrieval unit that retrieves the at least one of device registration and device attribute from the plurality of databases;

an identifying unit that identifies whether a first device retrieved from a database is identical to one or more devices retrieved from another database, based on the attributes of the first retrieved devices and the one or more retrieved devices; and a display that displays a result identified by the identifying unit;

wherein the display displays the first retrieved device and the one or more retrieved devices judged to be identical as a single device based on the result identified by the identifying unit; and wherein the single device represents the first retrieved device and the one or more retrieved devices judged to be identical.

8. The device retrieval device according to claim 7, wherein the information comprises at least one of a part of a device registration and a device attribute.

9. The device retrieval device according to claim 7, further comprising: a device registration unit that registers a device in a database with an attribute of the device.

10. A device retrieval method comprising:

retrieving at least one of a part of a device registration and a device attribute from a plurality of databases, wherein each database stores at least one of a part of the device and the device attribute;

identifying whether a first device retrieved from a database is identical to one or more devices retrieved from another database, based on the attributes of the first retrieved device and the one or more retrieved devices; and displaying the first retrieved device and the one or more retrieved devices judged to be identical as a single device based on the identification results;

wherein the single device represents the first retrieved device and the one or more retrieved devices judged to be identical.

11. The device, retrieval method according to claim 10, wherein the information comprises at least one of a part of a device registration and a device attribute.

12. The device retrieval method according to claim 10, further comprising: registering a device in a database with an attribute of the device.

13. A storage medium readable by a computer, the storage medium storing a program of instructions executable by the computer to perform a function for retrieving a device, the function comprising:

retrieving a first device from a plurality of databases;

identifying whether the retrieved first device is identical to one or more devices retrieved from another database, based on information; and displaying the retrieved first device and the one or more devices retrieved from another database as one device, wherein the one device represents each of the first device and the one or more devices retrieved from another database identified to be identical.

14. The storage medium according to claim 13, wherein the information includes at least one of a part of a device registration and an attribute of the device.

* * * * *